(12) United States Patent
Tsuzuki

(10) Patent No.: US 7,725,775 B2
(45) Date of Patent: May 25, 2010

(54) NETWORK SYSTEM, PRINTING DEVICE, AND CONTROL PROGRAM FOR PRINTING DEVICE

(75) Inventor: Ryosuke Tsuzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 397 days.

(21) Appl. No.: 11/533,732

(22) Filed: Sep. 20, 2006

(65) Prior Publication Data

US 2007/0083797 A1 Apr. 12, 2007

(30) Foreign Application Priority Data

Sep. 26, 2005 (JP) .............................. 2005-278859

(51) Int. Cl.
*G06F 11/00* (2006.01)
(52) U.S. Cl. ................................ 714/44; 714/4; 714/48
(58) Field of Classification Search ........................ None
See application file for complete search history.

(56) References Cited

U.S. PATENT DOCUMENTS

| | | | | |
|---|---|---|---|---|
| 6,256,322 B1 * | 7/2001 | Wilson, Jr. | ................. | 370/469 |
| 6,314,476 B1 * | 11/2001 | Ohara | ......................... | 710/15 |
| 6,327,677 B1 * | 12/2001 | Garg et al. | ..................... | 714/37 |
| 6,401,116 B1 * | 6/2002 | Okigami | ..................... | 709/223 |
| 6,622,266 B1 * | 9/2003 | Goddard et al. | ............... | 714/44 |
| 6,885,469 B1 * | 4/2005 | Tanimoto | .................... | 358/1.14 |
| 6,973,597 B2 * | 12/2005 | Schroath et al. | ............... | 714/44 |
| 7,017,071 B2 * | 3/2006 | Katayama et al. | .............. | 714/4 |
| 7,249,706 B2 * | 7/2007 | Naito | ......................... | 235/375 |
| 7,265,819 B2 * | 9/2007 | Raney | ....................... | 358/1.15 |
| 7,266,601 B2 | 9/2007 | Maekawa et al. | | |
| 7,269,763 B2 * | 9/2007 | Maehara | ...................... | 714/48 |
| 7,418,634 B2 * | 8/2008 | Okuhara et al. | ............... | 714/44 |

2001/0034852 A1 * 10/2001 Kawashima ................... 714/4

(Continued)

FOREIGN PATENT DOCUMENTS

JP H09-093248 A 4/1997

(Continued)

OTHER PUBLICATIONS

Microsoft Computer Dictionary 4th Ed., Microsoft Press, 1999, p. 414.*

(Continued)

*Primary Examiner*—Christopher S McCarthy
(74) *Attorney, Agent, or Firm*—Baker Botts L.L.P.

(57) ABSTRACT

A network system comprises a printing device, and a plurality of management devices that manages the printing device via a network. The printing device comprises a plurality of communication interfaces individually connected to the network, a trouble detecting system that detects troubles caused in the printing device, a trouble notification management information storing system that stores trouble notification management information representing a relationship among information on a management device to be notified of a trouble, information on a communication interface used by the management device, and information on a method of delivering trouble notifying information, and a trouble notifying system that delivers the trouble notifying information to the management device in a corresponding method via a corresponding communication interface by reference to the trouble notification management information. Each of the plurality of the management devices comprises a receiving system that receives the trouble notifying information.

11 Claims, 15 Drawing Sheets

| ADMINISTRATOR NAME | TROUBLE NOTIFICATION SETTING | I/F | KIND OF TROUBLE | NOTIFYING METHOD | NOTIFIED DEVICE INFORMATION |
|---|---|---|---|---|---|
| Admin1-1 | ENABLED | I/F1 | Cover Open Paper Jam | E-mail | SMTP:123.45.67.89 E-mail:admin11@test.jp |
| Admin2-1 | ENABLED | I/F2 | Paper Jam | HTTP | IP:123.45.78.99 |
| Admin2-2 | ENABLED | I/F2 | Toner Life End Cover Open Paper Jam | SNMP | IP:123.45.78.102 |

U.S. PATENT DOCUMENTS

| | | |
|---|---|---|
| 2003/0028826 A1* | 2/2003 | Balluff .................. 714/44 |
| 2003/0093710 A1* | 5/2003 | Hashimoto et al. ........... 714/4 |
| 2005/0134893 A1* | 6/2005 | Han ..................... 358/1.14 |
| 2006/0149992 A1* | 7/2006 | Shima .................... 714/4 |
| 2006/0184818 A1* | 8/2006 | Fujinawa ................. 714/4 |
| 2007/0083797 A1* | 4/2007 | Tsuzuki .................. 714/48 |

FOREIGN PATENT DOCUMENTS

| | | |
|---|---|---|
| JP | H11-194913 A | 7/1999 |
| JP | 2000207144 A | 7/2000 |
| JP | 2001125755 A | 5/2001 |
| JP | 2001-191619 A | 7/2001 |
| JP | 2003-108448 A | 4/2003 |
| JP | 2004-130790 A | 4/2004 |
| JP | 2004-221723 A | 8/2004 |
| JP | 2004-334582 A | 11/2004 |
| JP | 2005-150847 A | 6/2005 |

OTHER PUBLICATIONS

Japanese Patent Office, Notification of Reasons of Rejection for Japanese Patent Application No. 2005-278859 (counterpart to above-captioned patent application), dispatched Aug. 7, 2008.

Japanese Patent Office, Decision of Rejection for Japanese Patent Application No. 2005-278859 (counterpart to above-captioned patent application), mailed Oct. 15, 2008.

* cited by examiner

| ADMINISTRATOR NAME | TROUBLE NOTIFICATION SETTING | I/F | KIND OF TROUBLE | NOTIFYING METHOD | NOTIFIED DEVICE INFORMATION |
|---|---|---|---|---|---|
| Admin3-1 | ENABLED | I/F1 | Cover Open Paper Jam | E-mail | SMTP:123.45.67.89 E-mail:admin3-1@test.jp |
| Admin1-1 | ENABLED | I/F1 | Paper Jam | HTTP | IP:123.45.78.99 |
| Admin2-1 | ENABLED | I/F2 | Toner Life End Cover Open Paper Jam | SNMP | IP:123.45.78.102 |
| Admin2-2 | DISABLED | - | - | - | - |

FIG. 3

| KIND OF TROUBLE | TROUBLE NOTIFICATION SETTING | NOTIFYING METHOD | NOTIFIED DEVICE INFORMATION |
|---|---|---|---|
| Cover Open | ENABLED | E-mail | Admin3-1@IF1 (SMTP:123.45.67.89,E-mail:admin11@test.jp) |
| Paper Jam | ENABLED | SNMP | Admin1-1@IF1(IP:123.45.67.91) Admin2-1@IF2(IP:123.45.78.99) Admin2-2@IF2(IP:123.45.78.102) |
| Toner Life End | ENABLED | SNMP | Admin2-2@IF2(IP:123.45.78.102) |

FIG. 4

| ADMINISTRATOR NAME | TROUBLE NOTIFICATION SETTING | I/F | KIND OF TROUBLE | NOTIFYING METHOD | NOTIFIED DEVICE INFORMATION |
|---|---|---|---|---|---|
| Admin1-1 | ENABLED | I/F1 | Cover Open Paper Jam | E-mail | SMTP:123.45.67.89 E-mail:admin11@test.jp |
| Admin2-1 | ENABLED | I/F2 | Paper Jam | HTTP | IP:123.45.78.99 |
| Admin2-2 | ENABLED | I/F2 | Toner Life End Cover Open Paper Jam | SNMP | IP:123.45.78.102 |

FIG.11

| ADMINISTRATOR NAME | TROUBLE NOTIFICATION SETTING | I/F | KIND OF TROUBLE | NOTIFYING METHOD | NOTIFIED DEVICE INFORMATION |
|---|---|---|---|---|---|
| Admin1-1 | ENABLED | I/F1 | Cover Open | SNMP | IP:123.45.67.100 |
| | | | Paper Jam | SNMP | IP:123.45.67.100 |
| | | | No Paper | SNMP | IP:123.45.67.100 |
| Admin2-1 | ENABLED | I/F2 | Paper Jam | HTTP | IP:123.45.78.99 |
| | | | Toner Life End | HTTP | IP:123.45.78.99 |
| Admin2-2 | ENABLED | I/F2 | Toner Life End | SNMP | IP:123.45.78.102 |
| | | | Cover Open | SNMP | IP:123.45.78.102 |
| | | | Paper Jam | SNMP | IP:123.45.78.102 |
| Admin3-1 | ENABLED | I/F2 | Toner Life End | E-mail | SMTP:123.45.78.101 E-mail:admin31@hoge.jp |
| | | | Cover Open | E-mail | SMTP:123.45.78.101 E-mail:admin31@hoge.jp |
| | | | Paper Jam | E-mail | SMTP:123.45.78.101 E-mail:admin31@hoge.jp |

FIG.13

| ADMINISTRATOR NAME | TROUBLE NOTIFICATION SETTING | I/F | KIND OF TROUBLE | NOTIFYING METHOD | NOTIFIED DEVICE INFORMATION |
|---|---|---|---|---|---|
| Admin1-1 | ENABLED | I/F1 | Cover Open | SNMP | IP:123.45.67.100 |
| | | | Paper Jam | SNMP | IP:123.45.67.100 |
| | | | No Paper | E-mail | SMTP:123.45.67.89<br>E-mail:admin11@test.jp |
| Admin2-1 | ENABLED | I/F2 | Paper Jam | HTTP | IP:123.45.78.99 |
| | | | Toner Life End | HTTP | IP:123.45.78.99 |
| Admin2-2 | ENABLED | I/F2 | Toner Life End | SNMP | IP:123.45.78.102 |
| | | | Cover Open | SNMP | IP:123.45.78.102 |
| | | | Paper Jam | SNMP | IP:123.45.78.102 |
| Admin3-1 | ENABLED | I/F2 | Toner Life End | E-mail | SMTP:123.45.78.101<br>E-mail:admin31@hoge.jp |
| | | | Cover Open | E-mail | SMTP:123.45.78.101<br>E-mail:admin31@hoge.jp |
| | | | Paper Jam | E-mail | SMTP:123.45.78.101<br>E-mail:admin31@hoge.jp |

FIG.16

NETWORK SYSTEM, PRINTING DEVICE, AND CONTROL PROGRAM FOR PRINTING DEVICE

CROSS-REFERENCE TO RELATED APPLICATION

This application claims priority under 35 U.S.C. §119 from Japanese Patent Application No. 2005-278859, filed on Sep. 26, 2005. The entire subject matter of the application is incorporated herein by reference.

BACKGROUND

1. Technical Field

The following description relates to a network system, a printing device, and a control program for the printing device.

2. Related Art

There is disclosed in Japanese Patent Provisional Publications No. 2001-125755 and No. 2000-207144 a network system configured to notify not only terminal devices for clients who use a printing device, but also terminal devices for administrators who manage the printing device (i.e., management devices) of a trouble (error) caused in the printing device when using the printing device on a network.

SUMMARY

Aspects of the present invention are advantageous in that there can be provided an improved network system in which a notification of a trouble caused in a printing device provided with two or more communication interfaces can adequately be given depending on an environment of a network connected with a management device, a printing device included in the network system, and a computer program designed to control the printing device to perform a predetermined operation.

BRIEF DESCRIPTION OF THE ACCOMPANYINGS DRAWINGS

FIG. 3 is a first example of trouble notification management information in accordance with one or more aspects of the present invention.

FIG. 4 is a second example of the trouble notification management information in accordance with one or more aspects of the present invention.

FIG. 11 is a third example of the trouble notification management information in accordance with one or more aspects of the present invention.

FIG. 13 is a fourth example of the trouble notification management information in accordance with one or more aspects of the present invention.

FIG. 16 is a fifth example of the trouble notification management information in accordance with one or more aspects of the present invention.

DETAILED DESCRIPTION

Figure 1:
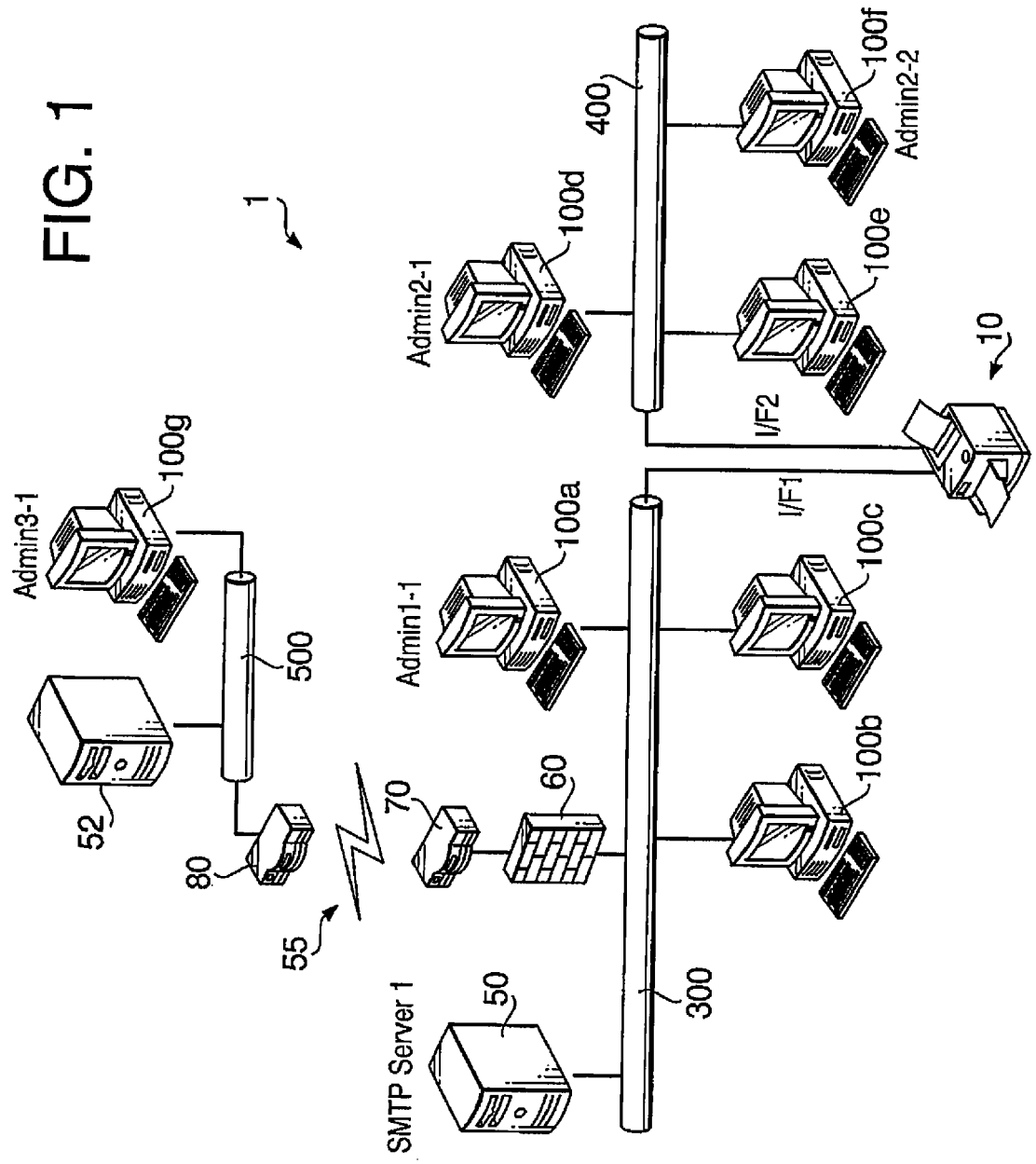
FIG. 1 is a schematic configuration of a network system in accordance with a first aspect of the present invention.

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided a network system, which comprises: a printing device; and a plurality of management devices configured to manage the printing device, the plurality of management devices being connected with the printing device via a network. The printing device comprises: a plurality of communication interfaces that are individually connected to the network; a trouble detecting system configured to detect troubles that may be caused in the printing device; a trouble notification management information storing system configured to store trouble notification management information that represents a corresponding relationship among specific information on a management device to be notified of a trouble caused, specific information on a communication interface to be used by the management device, and specific information on a method of delivering trouble notifying information for notifying the management device of the trouble; and a trouble notifying system configured to deliver the trouble notifying information to the management device in a corresponding method via a corresponding communication interface by reference to the trouble notification management information. Each of the plurality of the management devices comprises a receiving system configured to receive the trouble notifying information from the printing device.

According to another aspect of the present invention, there is provided a printing device that is managed by a management device via a network, which comprises: a plurality of communication interfaces that are individually connected to the network; a trouble detecting system configured to detect troubles that may be caused in the printing device; a trouble notification management information storing system configured to store trouble notification management information that represents a corresponding relationship among specific information on a management device to be notified of a trouble caused, specific information on a communication interface to be used by the management device, and specific information on a method of delivering trouble notifying information for notifying the management device of the trouble; and a trouble notifying system configured to deliver the trouble notifying information to a specified management device in a specified method via a specified communication interface by reference to the trouble notification management information.

According to a further aspect of the present invention, there is provided a computer usable medium having computer readable instructions that causes a computer to control a printing device, which is managed by a plurality of management devices via a network, having a plurality of communication interfaces individually connected to the network to: detect a trouble caused in the printing device; and deliver trouble notifying information for giving a notification of the trouble caused, by reference to trouble notification management information that represents a corresponding relationship among specific information on a management device to be notified of the trouble, specific information on a communication interface to be used by the management device, and specific information on a method of delivering the trouble notifying information, to the management device in a corresponding method via a corresponding communication interface.

According to some aspects of the present invention, the printing device can set a suitable communication interface and method of delivering the trouble notifying information for each of the management devices connected with the network as a device to be notified of the trouble. Therefore, a network system can be configured to give the trouble notification suitable for an environment of the network connected to the management device.

Optionally, the trouble detecting system may be configured to detect a trouble caused in the printing device and to specify the kind of the trouble. Further optionally, the trouble notification management information may include specific information on the kind of the detected trouble associated with the specific information on the management device. In this case, the trouble notifying system may be configured to deliver the trouble notifying information to a management device corresponding to the kind of the detected trouble by reference to the trouble notification management information. The kinds of the troubles caused in the printing device are various, and frequencies or difficulty levels of the troubles are different depending on the kinds of the troubles. Accordingly, the printing device can efficiently be managed in the network system by assigning a different administrator depending on each of the kinds of the troubles. In the aforementioned configuration, when a specific trouble is caused, the trouble notifying information is selectively delivered to an administrator required to handle the trouble. Hence, the administrator required to handle the trouble can adequately and promptly grasp the trouble notifying information, while an administrator who is not required to handle the trouble is prevented from being confused by receiving the trouble notifying information related to the trouble.

Optionally, the network connected with the printing device may include a plurality of sub networks, each of which is connected with at least one of the plurality of management devices. In this case, the method of delivering the trouble notifying information may be specified depending on each of the plurality of sub networks. Thereby, the method of delivering the trouble notifying information can be optimized. Consequently, the trouble notifying information can certainly and quickly be delivered to the management device(s) connected with each of the sub networks, and information leaks among the plurality of sub networks can less easily be caused. Namely, a network security can be improved.

Specifically, the plurality of sub networks may include a first network as a local area network configured with the printing device and at least one of the plurality of management devices being directly connected, and a second network including an internet communication network through which at least one of the plurality of management devices is connected with the printing device. In this case, there may be employed as the method of delivering the trouble notification management information to a first management device connected with the first network a first method, which is "enabled" in the first network, based on a communication protocol with which it is impossible to send information to the internet communication network, and there may be employed as the method of delivering the trouble notification management information to a second management device connected with the second network a second method based on a communication protocol with which it is possible to send information to the internet communication network. By employing the first method based on a communication protocol enabled only in the first network for the first management device directly connected with the printing device on the first network (Local Area Network: LAN), information can be prevented from being leaked to an external device via the internet communication network or the like. In the meantime, by employing the second method of delivering the trouble notifying information based on a communication protocol with which information can be sent to the internet communication network for a management device used by an external administrator, the trouble notifying information can easily be delivered to a faraway administrator outside the LAN.

Specifically, a communication protocol employed in the first method may be an SNMP (Simple Network Management Protocol). In this case, by means of simple and easy application, the trouble notifying information can easily be displayed in a pop-up window on a display of the management device connected with the first network (LAN).

On the other hand, a communication protocol employed in the second method may be an internet e-mail protocol. In this case, the trouble notifying information can easily be delivered to the management device remotely connected with the printing device via the second network (internet) with the e-mail. Meanwhile, a communication protocol employed in the second method may be an HTTP. In this case, the trouble notifying information can easily be delivered to the management device remotely connected with the printing device via the second network (internet) with the e-mail, Namely, the trouble notifying information to be delivered with the HTTP is uploaded in a server with a predetermined network address, and can easily be obtained by accessing the predetermined network address from a web browser at the management device side.

Optionally, the first and second networks may be connected with different ones of the plurality of communication interfaces, respectively. Thereby, such a trouble that information on the first network leaks to the second network, or reversely, a computer on the first network is hacked via the second network can efficiently be prevented, so as to improve the network security.

Preferably, the second network may be connected with the first network via a firewall, and the trouble notifying information may be delivered from the printing device to the second management deice via the first network, the firewall, and the second network in this order. Thereby, the network security can further be improved.

Illustrative Aspects

Hereinafter, illustrative aspects according to the present invention will be described with reference to the accompanying drawings.

First Aspect

FIG. 1 schematically shows an example of a network system 1 to which the present invention is to be applied. The network system 1 shown in FIG. 1 is configured with a plurality of terminal devices 50, 100a, 100b, 100c, 100d, 100e, 100f, 52, 100g, and a printing device 10 being interconnected via networks 300, 400, 55, and 500. The printing device 10 is provided with two communication interfaces (I/F1 and I/F2) 18a and 18b. The network 300, directly connected to the communication interface I/F1, is connected with the terminal devices 100d, 100e, and 100f, while the network 400, directly connected to the communication interface I/F2, is connected with the terminal devices 100d, 100e, and 100f, and each of the networks 300 and 400 configures a sub network. Further, any of the networks 300 and 400 is configured as a wired LAN. It is noted that one or both of the communication interfaces I/F1 and I/F2 can be wireless communication interfaces, and a network (LAN) corresponding to each of them can be configured as a wireless network.

The network 300 configures a first category network, and the management device 100a (admin1-1) directly connected to the printing device thereon configures a first category management device. In addition, the network 300, via a firewall 60 and a broadband router 70, is connected to an internet communication network 55 configured with a local IP network (e.g., an ADSL communication network or an optical communication network) or the like. The internet communication network 55 is connected to the network 500 as a sub network via the broadband router 80, and the network 500 is connected to the terminal devices 52 and 100g. The network 500, for example, is a network of a company that manages the printing device 10. The internet communication network 55 and network 500 configure a second category network, and the management device 100g configures a second category management device. The terminal devices 50 and 52 are employed as mail communication servers for the management devices 100a (admin1-1) and 100g (admin3-1) performing e-mail sending and receiving operations with the printing device 10, respectively.

On the other hand, the network 400 is configured only with a wired LAN, and is not connected with the internet communication network 55, The terminal devices 100d (admin2-1, hereinafter, referred to as a management device 100d) and 100f (admin2-2, hereinafter, referred to as a management device 10f) are directly (in a wired manner) connected to the printing device 10 on the network 400. That is, the network 400 configures the first category network, and the management devices 100d and 100f configure the first category management devices, respectively.

Hereinafter, the networks 300, 400, and the like as directly connected to the interfaces I/F1 and I/F2 of the printing device 10, respectively are referred to as "internal networks" in some cases. Meanwhile, the networks 500 and the like as connected to the printing device via the internet communication network 55 are referred to as "external network" in some cases.

Figure 2:
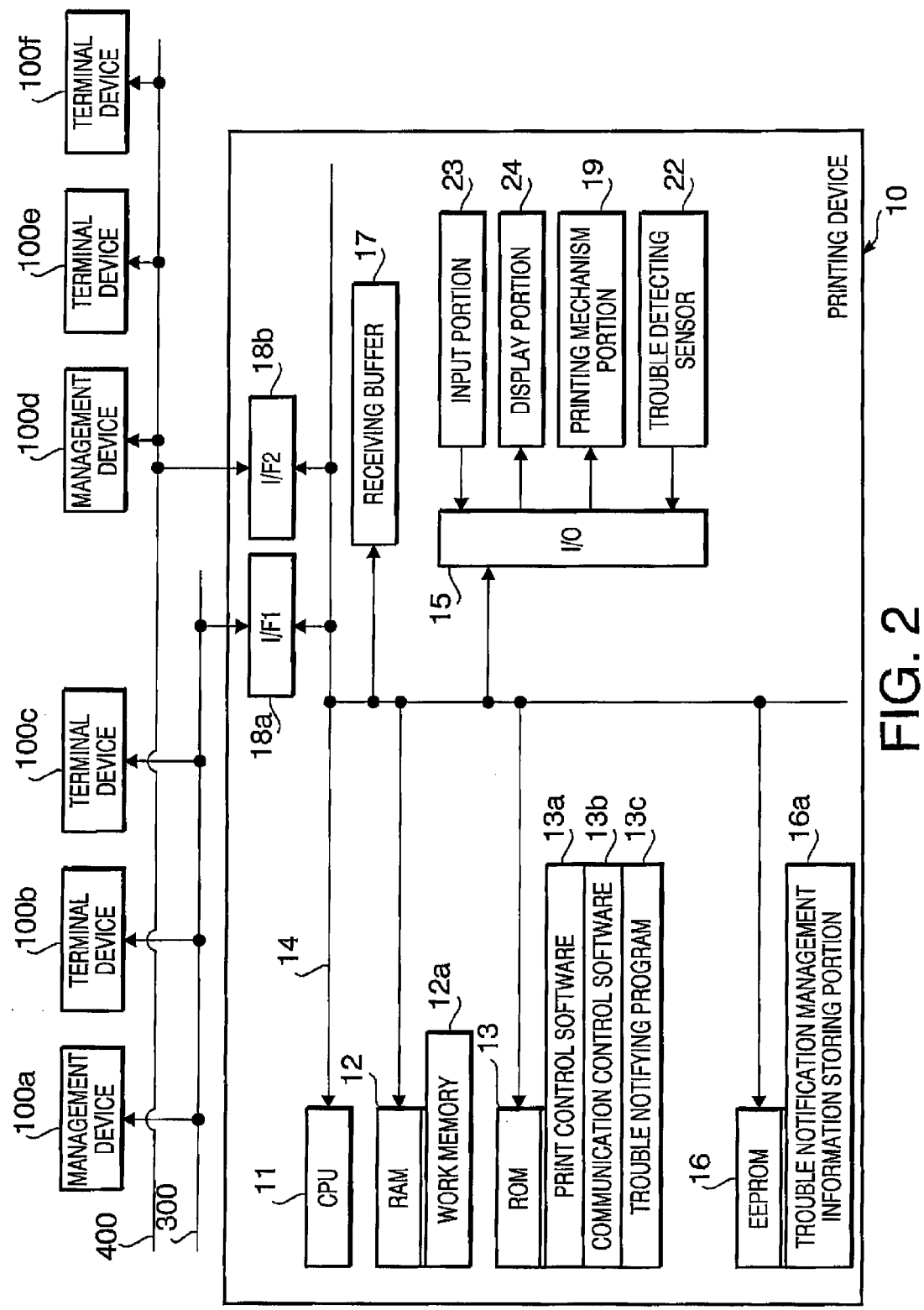
FIG. 2 is a block diagram exemplifying an electrical configuration of a printing device in accordance with one or more aspects of the present invention.

FIG. 2 is a block diagram illustrating an electrical configuration of the printing device 10. A main constituent that controls the printing device 10 is provided with a CPU 11, a ROM 13, a RAM 12 (volatile memory), an EEPROM 53 (rewritable non-volatile memory), a communication interface 18a that communicates with the network 300, a communication interface 18b that communicates with the network 400, a receiving buffer memory 17 that temporarily stores print control data received via the network 300 therein, and computer hardware to which an input/output (I/O) portion 15 is connected. The I/O portion 15 is connected to a printing mechanism portion configured with a widely known printing mechanism such as an inkjet printing mechanism, a laser printing mechanism, a thermal transfer printing mechanism, a dot impact printing mechanism, and the like, a display portion 23 configured with an LCD or the like, a touch panel, an input portion 23 configured with press button switches, a numeric keypad, or the like, and trouble detecting sensors 22 configured to detect a trouble (error) caused in the printing device 10. In the first aspect, although the printing device 10 is configured for exclusive use of printing, it can be configured as a Multi Function Peripheral (MFP) including a scanning portion used for copying and scanning an image, and a facsimile portion.

The printing device 10 is controlled to operate with a corresponding one of programs (software) 13a, 13b, and 13c stored in the RAM 13 being executed in a control work area (work memory) by the CPU 11. Among the programs, control software 13a is widely known print control software for actualizing a printing function, while communication control software 13b is widely known communication control software for communicating with each of the terminal devices 50, 100a, 100b, 100c, 100d, 100e, and 100f.

In addition, the trouble detecting sensors 22 are widely known sensors that are provided at predetermined positions including the printing mechanism portion 19 to detect a trouble caused in the printing device. The trouble detecting sensors 22, which are shown unified in one block in FIG. 2, include a plurality of sensors provided at the predetermined positions, and the types thereof differ depending on the kind of the trouble to be detected by each of them. For example, there are provided on a paper feeding line in the printing device 10 a paper rear end sensor for detecting a rear end of a fed paper passing, a resist roller front sensor and a resist roller rear sensor that are provided in front of and in the rear of a resist roller which conveys fed papers arranged in the same direction to a photoconductive drum so as to detect fed papers passing at the positions, respectively, and an paper ejection sensor that detects a paper, conveyed toward a catch tray after having passed through a fixing heat roller, passing, so that the CPU 11 can recognize a situation where each of the sensors does not detect a paper passing for a predetermined time period after paper feeding has been started as a paper jam error. Further, there are provided in the printing device 10 widely known sensors configured to detect errors such as a service call error, a toner exhaustion error, a size error representing that any printing paper of a suitable size does not exist, a size mismatch error representing that a required paper size is different from a size of papers in a tray, a memory full error representing a shortage of a printing memory capacity, a media type error representing an unsuitable media type of printing paper, a cover open error representing that a cover of the printing device 10 is left open, a no paper error representing a shortage of the printing paper, and a no tray error representing that a paper feeding tray of a printing paper requested to be fed does not exist, in addition to the aforementioned paper jam error. Each of the sensors is configured to detect a specific error. When an error is detected, the CPU 11 specifies which sensor has detected the error, so that the kind of the detected error can be specified.

There is provided in the EEPROM 16a trouble notification management information storing portion that stores trouble notification management information that indicates a corresponding relationship among specific information on the kind of the trouble (error), specific information on the management device defined as a trouble notified device that is to be notified of the trouble, specific information on the communication interface determined for each of the management devices to use, and specific information on the method of delivering the trouble notifying information determined for each of the management devices. A trouble notifying program 13c stored in the ROM 13 is a main portion of a print control program according to the present invention, and is in charge of a process of delivering the trouble notifying information to a management device corresponding to the detected trouble from a corresponding kind of communication interface in a corresponding method by referring to the aforementioned trouble notification management information. In addition, there is incorporated in the communication control software 13b mail sending and receiving functions of performing operations of sending and receiving an e-mail with the internet communication network connected to the network 300.

FIG. 3 is an example of a configuration of the trouble notification management information. As shown in FIG. 3, the trouble notification management information is configured as a table with an administrator name, the kind of a trouble to be notified the administrator of (here are exemplified "Cover Open" representing that the cover of the printing device 10 is left open, "Paper Jam", and "Toner Life End" representing the toner exhaustion error), a trouble notifying method (namely, the method of delivering the trouble notifying information, which is any one of SNMP, HTTP, an e-mail), and specific information on the management device that is assigned to each of the administrators (which is an IP address when the SNMP or the HTTP is employed as the trouble notifying method, or an address of a mail communication server and an e-mail address when the e-mail is employed as the trouble notifying method) being associated with each other. It is noted that, to some kinds of troubles, two or more management devices are assigned as the trouble notified device such that combinations of troubles of which the notification is to be given are different between the two or more management devices as a result. It is noted that although the table in FIG. 3 is described categorized by the administrator name (i.e., the management device), the table may be described categorized by the kind of the trouble as shown in FIG. 4.

Figure 5:
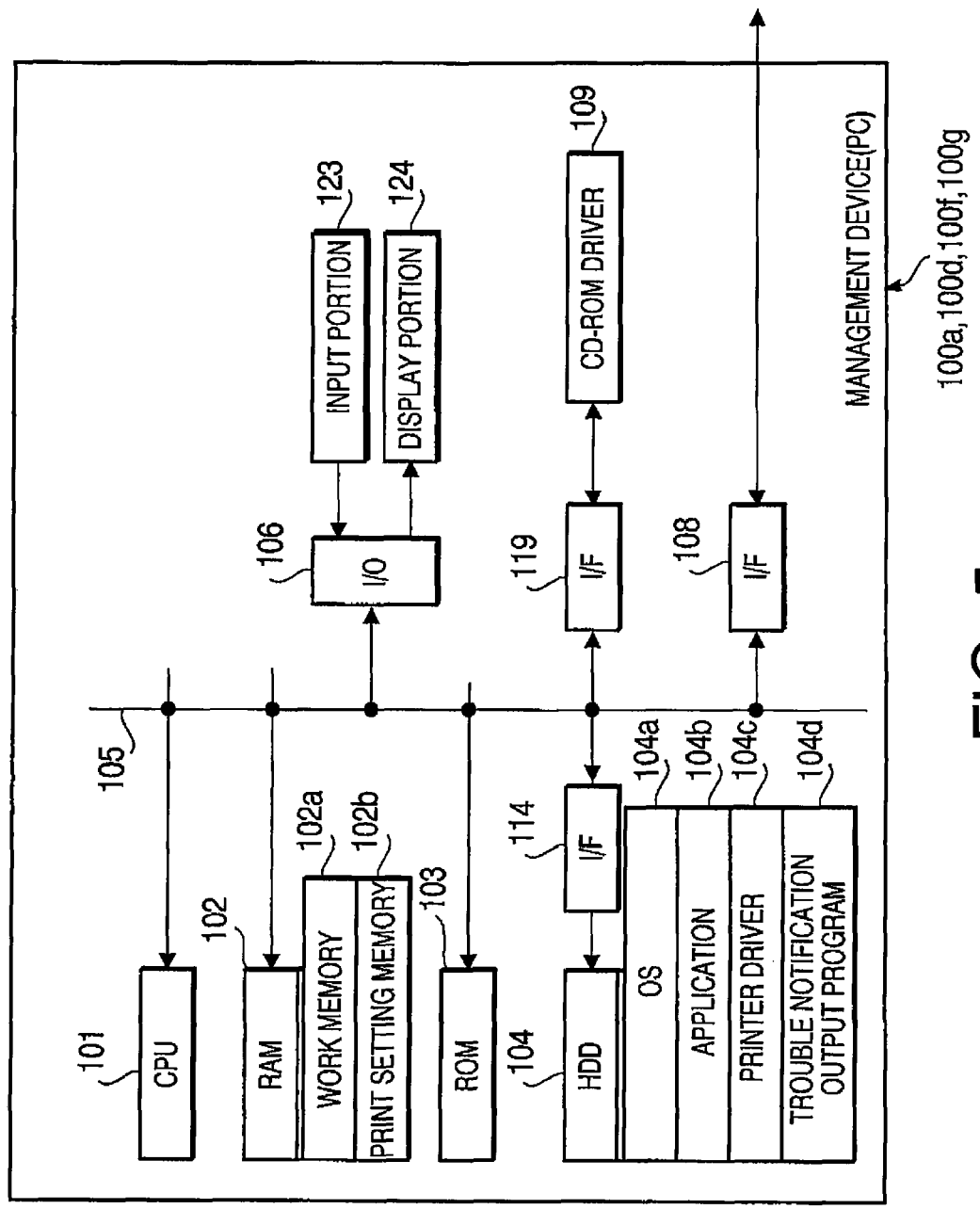
FIG. 5 is a block diagram exemplifying an electrical configuration of a management device in accordance with one or more aspects of the present invention.

FIG. 5 is an example of an electrical configuration of the management device 100a, 100d, 100f, or 100g. As shown in FIG. 5, the management device is configured with computer hardware with a CPU 101, RAM 102, ROM 103, communication interface 108 for performing data sending and receiving operations with the network (300, 400, or 500), and an input/output (I/O) portion 106 being connected via an internal bus 105. In addition, the management device is connected with a storing device 104 (an HDD is employed in the aspect), and a CD-ROM drive 109 via interfaces (I/Fs) 114 and 119, respectively. Further, the I/O portion 106 is connected with a display portion 124 configured with an LCD or a CRT, and an input portion 107 configured with a keyboard or a mouse.

There are installed in the storing device 104 an OS 104a as an infrastructure software of each of the management devices 100a, various kinds of application programs 104b with printing functions, and a printing device driver 104c for executing a print control instructing process for the printing device 10 (see FIG. 1) via the network (300 or 400). When execution of a printing job is assigned by an application program 104b, the CPU 101 executes the printing device driver 104c using a printing job work memory 102c, and printing data on the printing job are sent to the printing device 10 via the network (300, or 400). Print setting data such as a print format can, as required, be configured from a printing job window (not shown), and are employed with being loaded into a print setting memory 102b. When performing a printing operation, binary printing data, configured with the print setting data being attached to printing data to be rasterized, are forwarded to the printing device 10. The printing device 10 rasterizes the printing data to bit-mapped page printing image data with reference to the print setting data, and performs the printing operation.

In addition, there is stored in the storing device 104 a trouble notification output program 104d. The trouble notification output program 104d is software designed to receive the trouble notifying information and display a popup window in which the trouble notifying information is described on the display portion 124 when the trouble notifying method (protocol) is the SNMP. Meanwhile, the trouble notification output program 104d is web browser software designed to access a web server in which the trouble notification information is uploaded and obtain the trouble notification information when the trouble notifying method is the HTTP. Furthermore, the trouble notification output program 104d is e-mail sending and receiving software designed to receive, open, and browse an e-mail including the trouble notifying information when the trouble notifying method is the e-mail.

Figure 6:
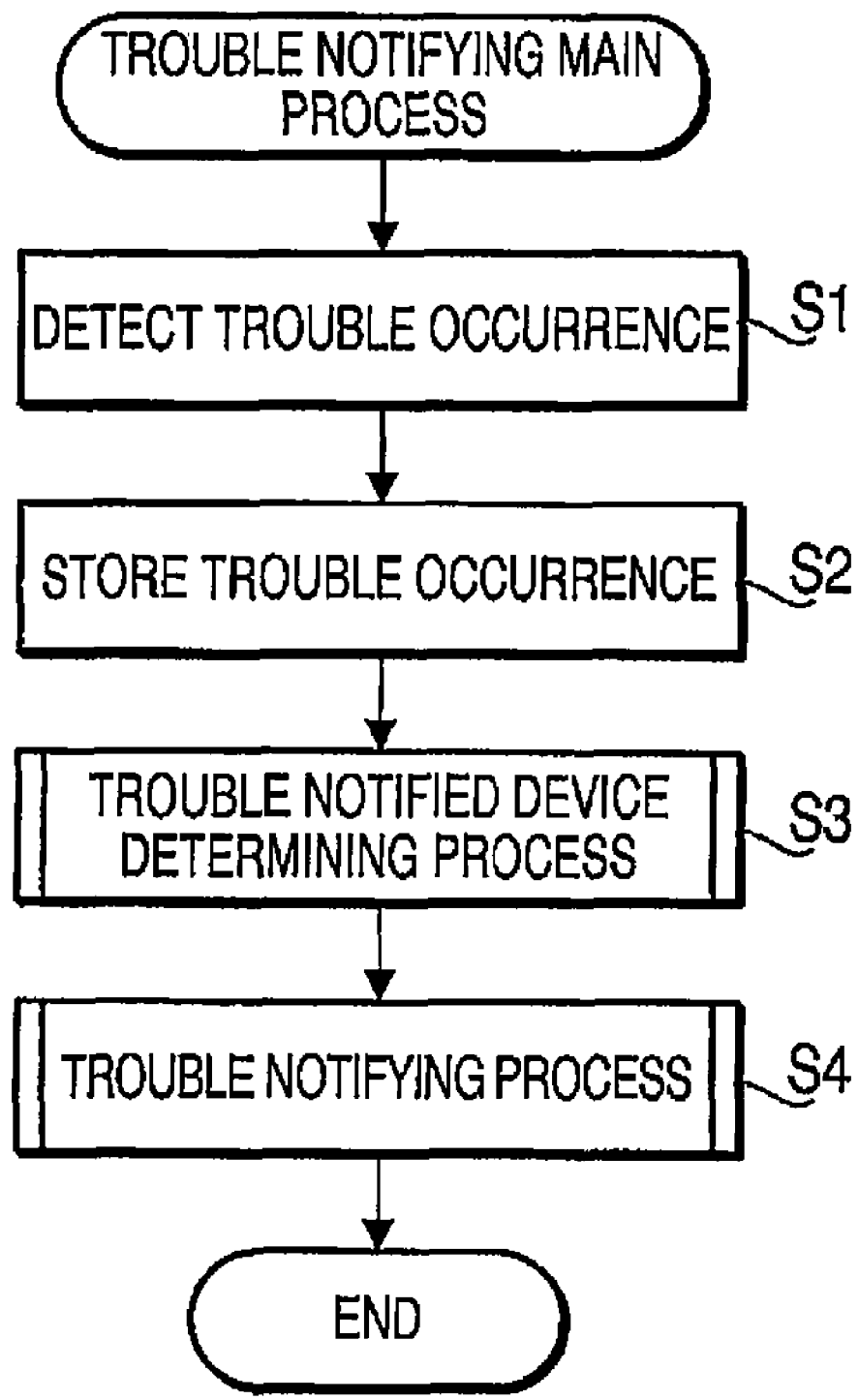
FIG. 6 is a flowchart showing a procedure of a procedure of a trouble notifying main process in accordance with one or more aspects of the present invention.
Figure 7:
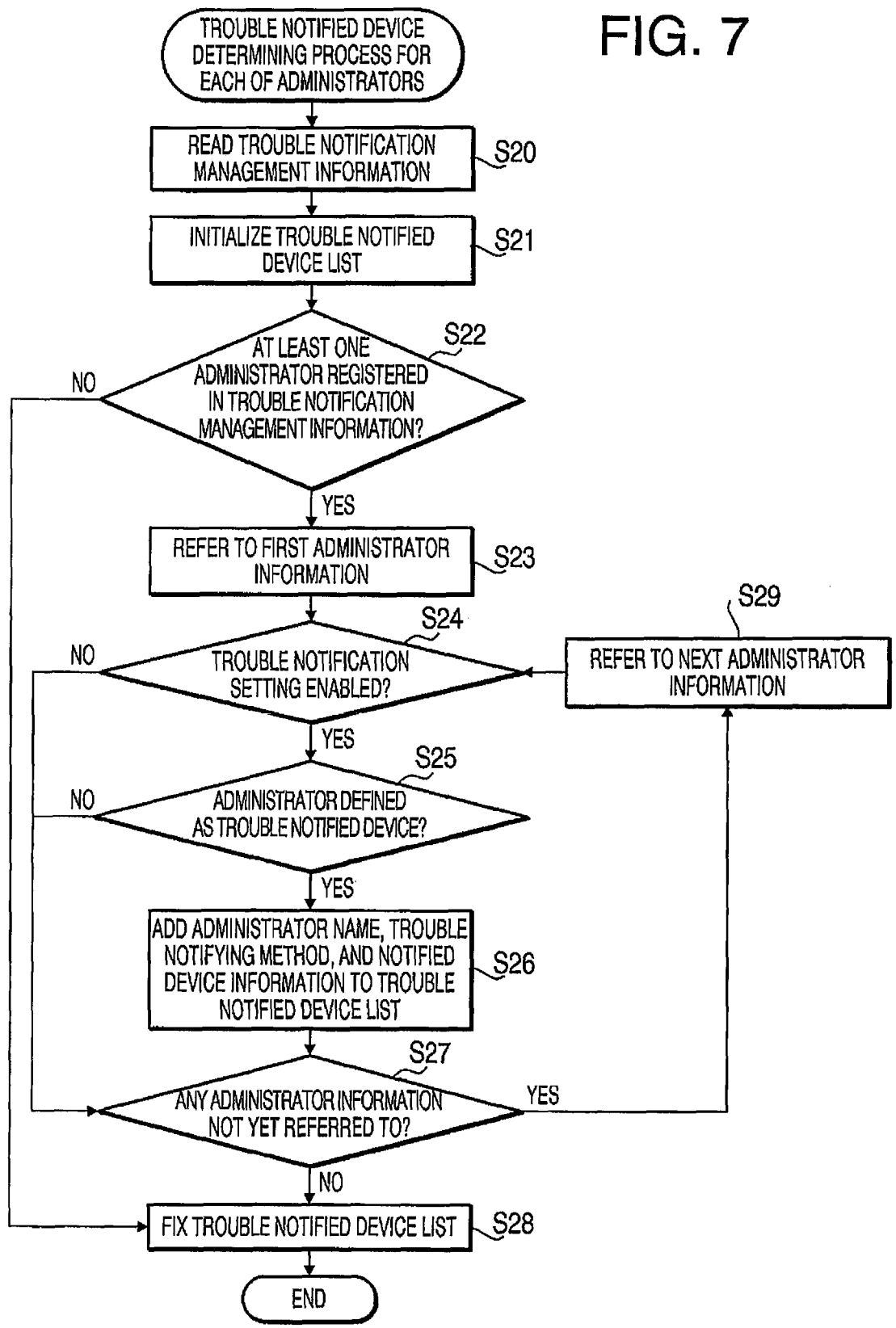
FIG. 7 is a flowchart showing a procedure of a first example of a trouble notified device determining process in accordance with one or more aspects of the present invention.
Figure 9:
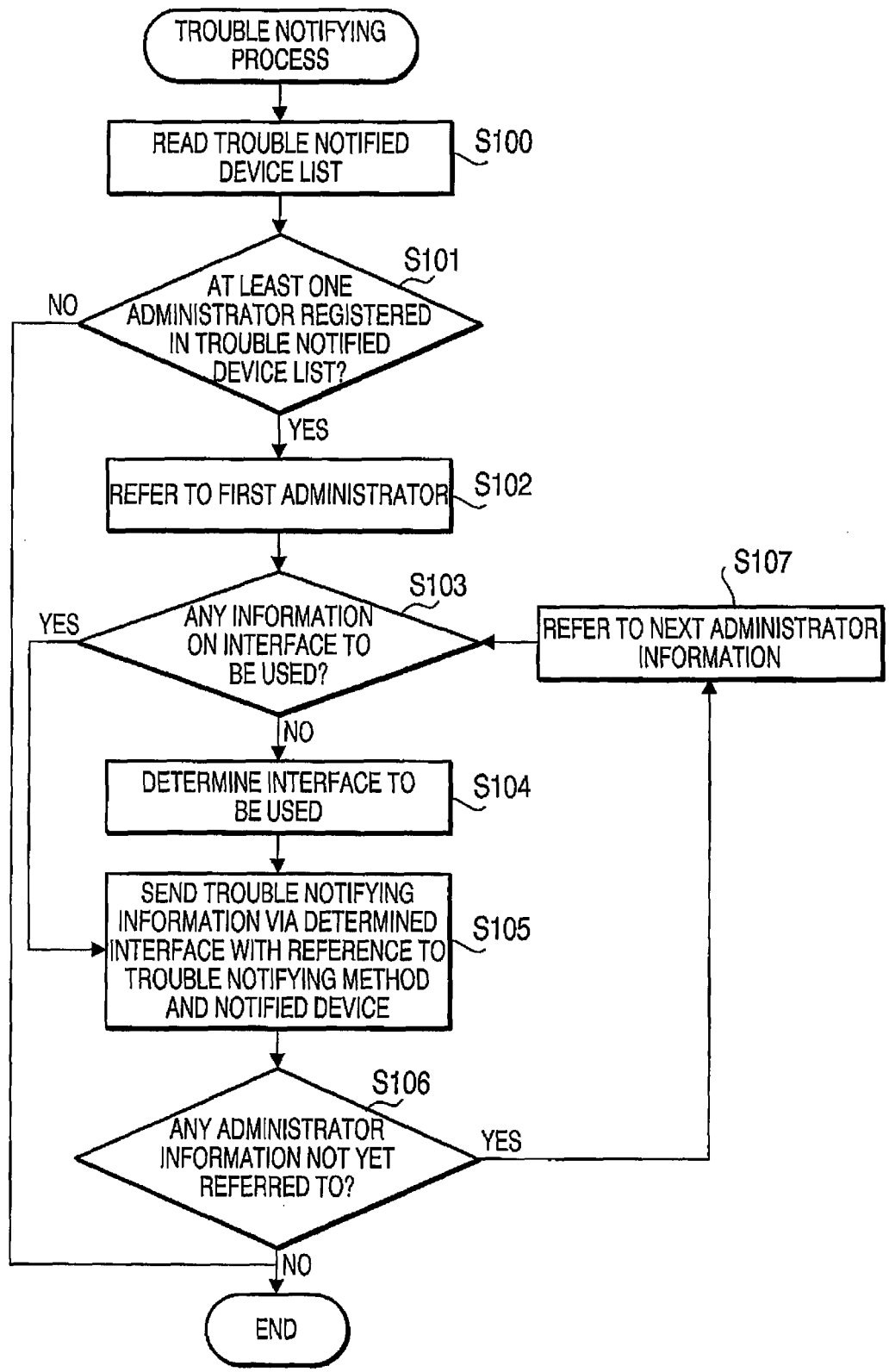
FIG. 9 is a flowchart showing a procedure of a trouble notifying process in accordance with one or more aspects of the present invention.

Hereinafter, an example of the trouble notifying process in the network system shown in FIG. 1 will be explained with flowcharts. FIG. 6 is a flowchart showing a procedure of a trouble notifying main process. In a step of Si, occurrence and the kind of a trouble are detected by the trouble detecting sensor 22 (see FIG. 2). Next, in a step of S2, information on the trouble occurrence is stored in a predetermined area of the RAM 12 (see FIG. 2). In a step of S3, a trouble notified device determining process as shown in FIG. 7 is executed. In a step of S4, a trouble notifying process as shown in FIG. 9 is executed to notify the trouble notified device determined of the trouble occurrence.

FIG. 7 is a flowchart showing a schematic procedure of the trouble notified device determining process (to be executed in the step of S3 in FIG. 6) in the case where the trouble notified device is determined with a priority being given to the administrator name, In a step of S20, trouble notification setting information, that is, the trouble notification management information (16a in FIG. 2) is read out. In a step of S21, a trouble notified device list (stored in the RAM 12 in FIG. 2) in which there are registered devices to be notified of the trouble caused this time is initialized. In a step of S22, it is checked whether at least one administrator (management device) is registered in the trouble notification management information (see FIG. 3). When it is not judged that at least one administrator is registered in the trouble notification management information (S22: No), the process is terminated through a step of S28. On the other hand, when it is judged that at least one administrator is registered in the trouble notification management information (S22: Yes), the process goes to a step of S23.

FIG. 3 shows the trouble notification management information to be referred to in the trouble notified device determining process (S3) to be executed according to the procedure shown in FIG. 7. Based on the trouble management information, the management device 100g (admin3-1: the second category management device) connected to the external network 500 (which configures the second category network together with the internet communication network 55) is set such that the trouble notifying information is sent thereto via the interface I/F1 with the e-mail. There are registered as notified device information in the trouble notification management information the IP address of the mail communication server (50 in FIG. 2) and the e-mail address of the administrator. The kinds of the troubles of which the notification is to be given are "Cover Open" and "Paper Jam". In addition, the management device 100a (admin1-1: the first category management device) connected to the internal network 300 (the first category network) is set such that the trouble notifying information is sent thereto via the interface I/F1 with the HTTP. There is registered as the notified device information in the trouble notification management information the IP address of the management device 100a (admin1-1). The kind of the trouble of which the notification is to be given is "Paper Jam". Further, the management device 100d (admin2-1: the first category management device) connected to the internal network 400 (the first category network) is set such that the trouble notifying information is sent thereto via the interface I/F2 with the SNMP. There is registered as the notified device information in the trouble notification management information the IP address of the management device 100d (admin2-1). The kinds of the troubles of which the notification is to be given are "Toner Life End", "Cover Open" and "Paper Jam". It is noted that although the internal network 400 is connected with the management device 100f (admin2-2) as well, a setting of a trouble notification for the management device 100f is configured "disabled", so that the notification of the trouble occurrence cannot be given.

It is noted that since there is not the terminal device 50 (mail communication server for sending and receiving an e-mail) as seen in the network 300 in the internal network 400, the trouble notifying information cannot be delivered to the management device 100d or 100f directly connected to the internal network 400 with the e-mail. In addition, an SNMP packet transmitted through the network 300 connected to the internet communication network 55 is blocked by the firewall 60 not to be sent to the internet communication network 55. Accordingly, the trouble notification based on the SNMP cannot be given to the external network 500. Hence, the trouble notifying method based on the SNMP belongs to a first category delivering method, and those based on the HTTP and e-mail belong to a second category delivering method.

Referring to FIG. 7 again, in a step of S23, first administrator information in the trouble notification management information is referred to. In a step of S24, when the setting of the trouble notification for the administrator is judged "enabled" (S24: Yes), the process goes to a step of S25. In the step of S25, it is checked whether the administrator is defined as the trouble notified device to be notified of the trouble caused this time. When it is judged that the administrator is defined as the trouble notified device to be notified of the trouble caused this time (S25: Yes), the process goes to a step of S26 to add the administrator name, trouble notifying method (the method of delivering the trouble notifying information), notified device information stored in the trouble notification management information to the trouble notified device list. When the judgment result is "No" in the step of S24 or S25, the process goes to a step of S27, skipping the step of S26. In the step of S27, it is checked whether there is any administrator information in the trouble notification management information that has not yet been referred to. When it is judged that there is administrator information that has not yet been referred to (S27: Yes), the process goes to a step of S29, so as to refer to next administrator information and then repeat the steps of S24 to S27. In the step of S27, when the administrator information to be referred to comes to the end (S27: No), the process goes to the step of S28 to fix the contents of the trouble notified device list, and thereafter, the process is terminated.

Figure 8:
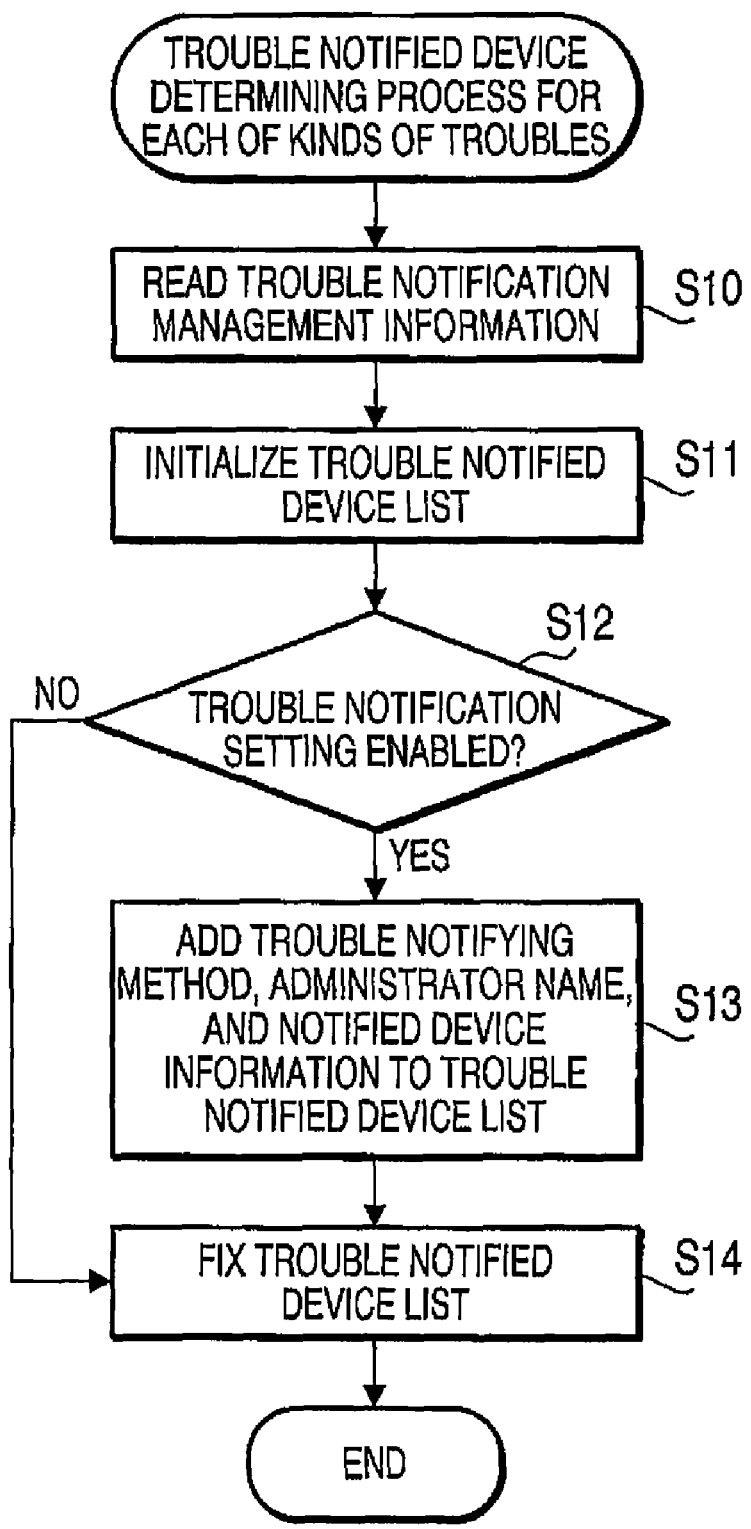
FIG. 8 is a flowchart showing a procedure of a second example of the trouble notified device determining process in accordance with one or more aspects of the present invention.

In the meantime, FIG. 8 is a flowchart showing a schematic procedure of the trouble notified device determining process (S3 in FIG. 6) when determining the trouble notified device with a priority being given to the kind of the trouble. Operations in steps of S10 and S11 are identical to those in the step of S20 and S21, respectively. An example of the trouble notification management information is shown in FIG. 4.

Here, FIG. 4 shows the trouble notification management information that is referred to in the trouble notified device determining process (S3) to be executed in accordance with the procedure shown in FIG. 8. According to the trouble notification management information shown in FIG. 4, for "Cover Open", there are registered as the notified device information the management device 100g (admin3-1: I/F1: the second category management device) together with the IP address of the mail communication server (50 in FIG. 2) and the e-mail address of the administrator, and the trouble notifying information thereon is set to be sent by the e-mail. For "Paper Jam", there are registered as the notified device information the management device 100a (admin1-1: I/F1: the first category management device), the management device 100d (admin2-1: L/F2: the first category management device), and the management device 100f (admin2-2: I/F2: the first category management device) together with the IP addresses of each of the management devices, and the trouble notifying information thereon is set to be sent by the SNMP. In addition, for "Toner Life End", there are registered as the notified device information the management device 100f (admin2-2: I/F2: the first category management device) together with the IP address thereof, and the trouble notifying information thereon is set to be sent by the SNMP.

Referring to FIG. 8 again, in a step of S12, it is checked whether the trouble notification setting for the kind of the trouble detected this time is "enabled". When it is judged that the trouble notification setting for the kind of the trouble detected this time is "enabled" (S12: Yes), the process goes to a step of S13 to add the trouble notifying method (the method of delivering the trouble notifying information), administrator name, and notified device information stored in the trouble notification management information to the trouble notified device list. In a step of S14, the contents of the trouble notified device list are fixed, and then, the process is terminated. Meanwhile, when the judgment result in the step of S12 is "No", the process goes to a step of S14, skipping the step of S13.

FIG. 9 is a flowchart showing a procedure of a trouble notifying process (S3 in FIG. 6). In a step of S100, the trouble notified device list that has been fixed in the step of S28 or S14 is read out. In a step of S101, it is checked whether at least one administrator (management device) to be notified of the trouble is registered in the trouble notified device list. When it is not judged that at least one administrator to be notified of the trouble is registered in the trouble notified device list (S101: No), the process is terminated. Meanwhile, when it is judged that at least one administrator to be notified the trouble is registered in the trouble notified device list (S101: No), the process goes to a step of S102 to refer to a first administrator registered in the trouble notified device list. In a step of S103, it is judged whether there is any information on the interface to be used. When it is judged that there is information on the interface to be used (S103: Yes), the process goes to a step of S104 to determine the interface to be used in accordance with the information on the interface. Meanwhile, when it is not judged that there is any information on the interface to be used (S103: No), the interface to be used is determined with reference to settings in a known routing table or the like. Thereafter, the process goes to a step of S105, and the trouble notifying information is sent via the determined interface with reference to the trouble notifying method (method of delivering the trouble notifying information) and notified device information that have been set. In a step of S106, it is checked whether there is any administrator information that has not yet referred to. When it is judged that there is administrator information that has not yet referred to (S106: Yes), the process goes to a step of S107 to refer to next administrator information and repeat the steps of S103 to S106. Meanwhile, when it is not judged that there is any administrator information that has not yet referred to (S106: No), the process is terminated.

Second Aspect

Figure 10:
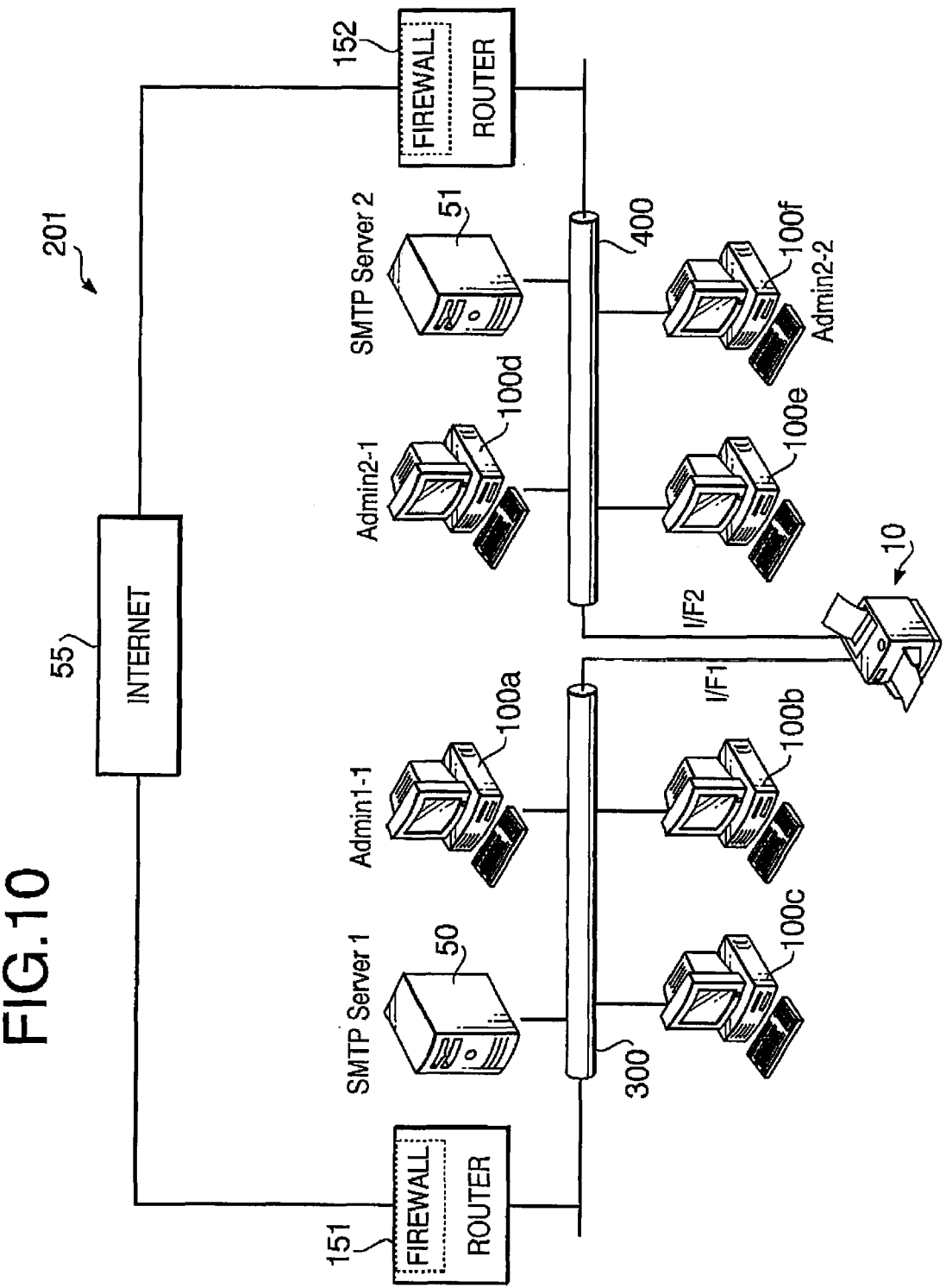
FIG. 10 is a schematic configuration of a network system in accordance with a second aspect of the present invention.

Hereinafter, another aspect according to the present invention will be explained. It is noted that the same reference characters are given to each of portions in common with the first aspect, and that detailed explanation about it will be omitted. According to a system 201 as shown in FIG. 10, both of internal networks 300 and 400 are connected to an internet communication network 55 via a network router (with a firewall function incorporated therein) 151 and 152, respectively. The internal networks 300 and 400 are connected with terminal devices 50 and 51 as mail communication servers, respectively. Each of management devices 100a (admin1-1), 100d (admin2-1), and 100f (admin2-2) is configured to receive a message including the trouble notifying information in the internal network 300 or 400 with the SNMP, the e-mail, or the HTTP.

A basic procedure of a trouble notifying process for notifying the administrator of a trouble caused in the printing device 10 is the same as that in the case where the notification of the trouble is given with a priority being put on the administrator name in the first aspect (corresponding to the flowchart shown in FIG. 7). It is noted that, in the second aspect, trouble notification management information is defined as shown in FIG. 11. According to the trouble notification management information shown in FIG. 11, the management device 100a (admin1-1) is set to receive the trouble notifying information via the interface I/F1 with the e-mail. Namely, the e-mail, including the trouble notification information, sent from the printing device 10 is sent to a mail server (not shown) connected with the internet communication network 55 via the mail communication server 50, and is sent back to the management device 100a from the mail server via the mail communication server 50. There are registered as the notified device information related to the management device 100a (admin1-1) in the trouble notification management information the IP address of the mail communication server (50 in FIG. 10) and an e-mail address of the administrator. The kinds of the troubles of which the management device 100a (admin1-1) is to be notified are "Cover Open" and "Paper Jam". In addition, the management device 100d (admin2-1) is set to receive the trouble notifying information via the interface I/F2 with the HTTP. There is registered as the notified device information related to the management device 100d (admin2-1) in the trouble notification management information the IP address of the management device 100d (admin2-1). The kind of the trouble of which the management device 100d (admin2-1) is to be notified is "Paper Jam". Further, the management device 100f (admin2-2) is set to receive the trouble notifying information via the interface I/F2 with the SNMP. There is registered as the notified device information related to the management device 100f (admin2-2) in the trouble notification management information the IP address of the management device 100f (admin2-2). The kinds of the troubles of which the management device 100f (admin2-2) is to be notified are "Toner Life End", "Cover Open", and "Paper Jam".

Third Aspect

Figure 12:
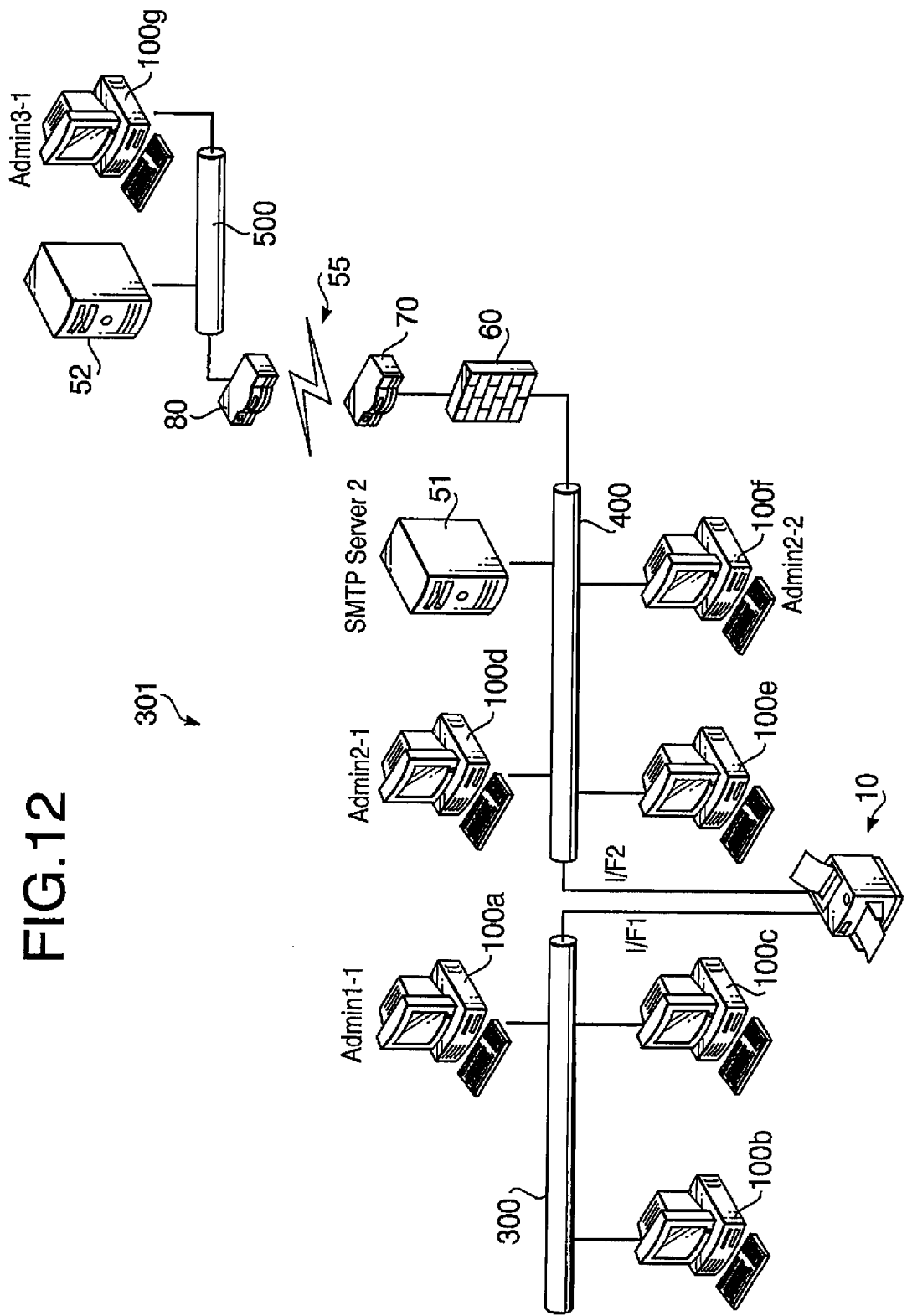
FIG. 12 is a schematic configuration of a network system in accordance with a third aspect of the present invention.

A system 301 shown in FIG. 12 has substantially the same configuration as that in the first aspect, except for a feature that an external network 500 is connected to an internal network 400 (the mail communication server is provided not in the internal network 300, but in the internal network 400).

Hereinafter, an example of a trouble notifying process in the system configuration as shown in FIG. 12 will be explained with reference to a flowchart. A trouble notifying main process has the same procedure as shown in FIG. 6. A trouble notifying process has the same procedure as shown in FIG. 9. FIG. 13 shows contents of trouble notification management information. According to the trouble notification management information shown in FIG. 13, the management device 100a (admin1-1) connected to the internal network 300 (the first category network) is set to receive the trouble notifying information via the interface I/F1 with the SNMP. There is registered as the notified device information related to the management device 100a (admin1-1) in the trouble notification management information the IP address of the management device 100a (admin1-1). The kinds of the troubles of which the management device 100a (admin1-1) is to be notified are "Cover Open", "Paper Jam", and "No Paper". In addition, the management device 100d (admin2-1: the first category management device) connected to the internal network 400 (the first category network) is set to receive the trouble notifying information via the interface I/F2 with the HTTP. There is registered as the notified device information related to the management device 100d (admin2-1) in the trouble notification management information the IP address of the management device 100d (admin2-1). The kinds of the troubles of which the management device 100d (admin2-1) is to be notified are "Paper Jam" and "Toner Life End". Further, the management device 100f (admin2-2: the first category management device) is set to receive the trouble notifying information via the interface I/F2 with the SNMP. There is registered as the notified device information related to the management device 100f (admin2-2) in the trouble notification management information the IP address of the management device 100f (admin2-2). The kinds of the troubles of which the management device 100f (admin2-2) is to be notified are "Toner Life End", "Cover Open", and "Paper Jam". The management device 100g (admin3-1: the second category management device) connected to the external network 500 (which configures the second category network together with the internet communication network 55) is set to receive the trouble notifying information via the interface I/F2 with the e-mail. There are registered as the notified device information related to the management device 100g (admin3-1) in the trouble notification management information the IP address of the mail communication server (52 in FIG. 12) and an e-mail address of the administrator. The kinds of the troubles of which the management device 100g (admin3-1) is to be notified are "Toner Life End", "Cover Open", and "Paper Jam".

Figure 14:
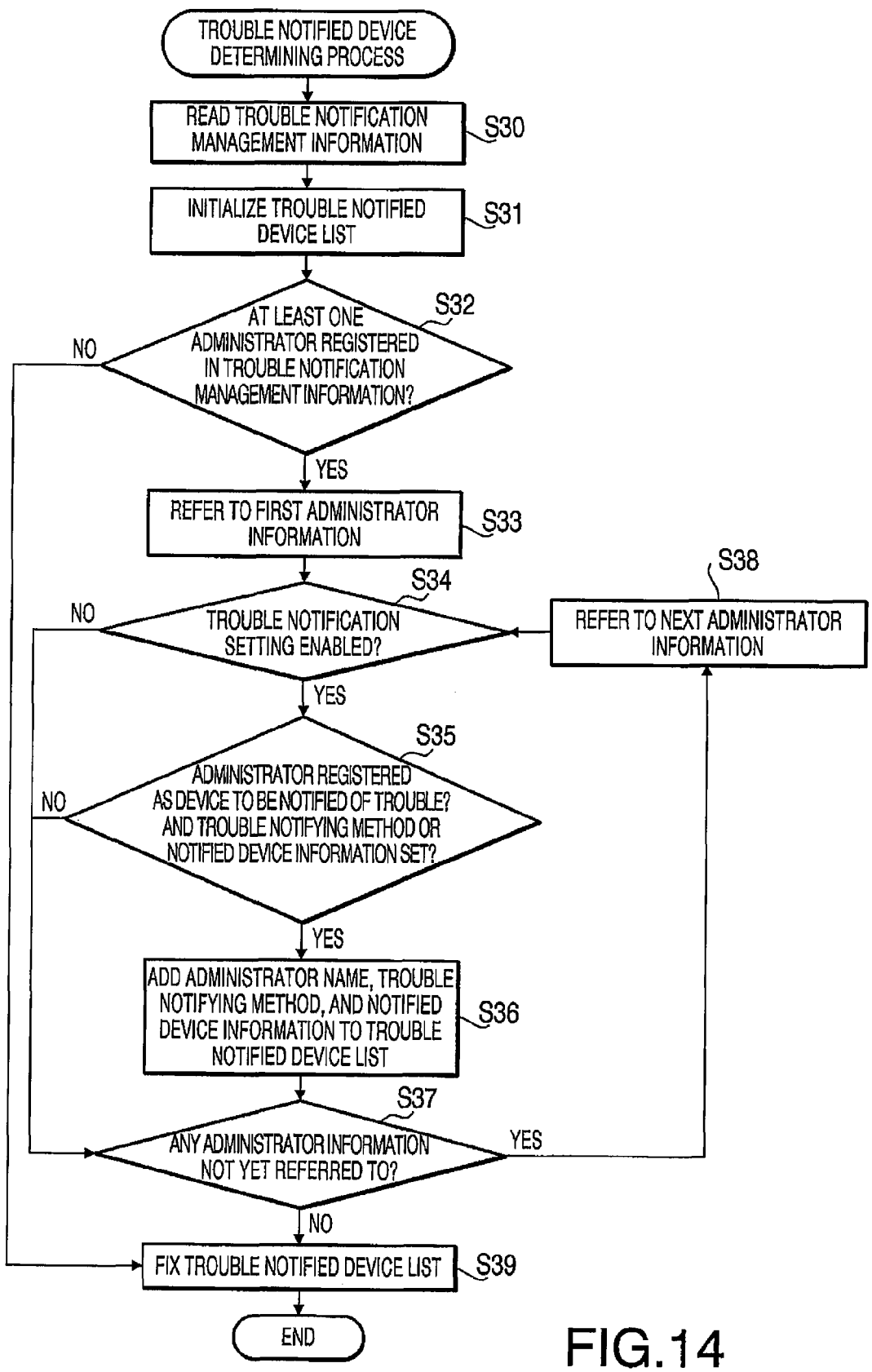
FIG. 14 is a flowchart showing a procedure of a third example of the trouble notified device determining process in accordance with one or more aspects of the present invention.

In addition, a flowchart shown in FIG. 14 is employed as a flowchart of a trouble notified device determining process. The flowchart shown in FIG. 14 is configured with the procedures of FIGS. 7 and 8 being mixed. Namely, in a step of S30, the trouble notification management information (trouble notification setting information) defined as shown in FIG. 13 is read out. In a step of S31, the trouble notifying device list is initialized. In a step of S32, it is checked whether at least one administrator (management device) is registered in the trouble notification management information (see FIG. 13). When it is not judged that at least one administrator is registered in the trouble notification management information (S32: No), the process is terminated after completing a step of S39. Meanwhile, when it is judged that at least one administrator is registered in the trouble notification management information (S32: Yes), the process goes to a step of S33 to refer to a first administrator information. When it is judged that the trouble notification setting for the administrator is "enabled" in a step of S34, the process goes to a step of S35. In the step of S35, it is checked whether the administrator is registered as a device to be notified of a trouble caused this time, and whether the trouble notifying method (method of delivering the trouble notifying information) and notified device information are set, When the judgment result is "Yes" in the step of S35, the process goes to a step of S36 to add the administrator name, trouble notifying method (method of delivering the trouble notifying information), and notified device information stored in the trouble notification management information to trouble notified device list. When the judgment result is "No" in the step of S34 or S35, the process goes to a step of S37, skipping the step of S36. In the step of S37, it is checked whether there is any administrator information in the trouble notification management information that has not yet been referred to. When it is judged that there is administrator information that has not yet been referred to (S37: Yes), the process goes to a step of S38 to refer to the next administrator information and repeat the steps of S34 to S37. Meanwhile, when it is not judged that there is any administrator information that has not yet referred to (S37: No), the process goes to the step of S39 to fix the trouble notified device list, and is then terminated.

Fourth Aspect

Figure 15:
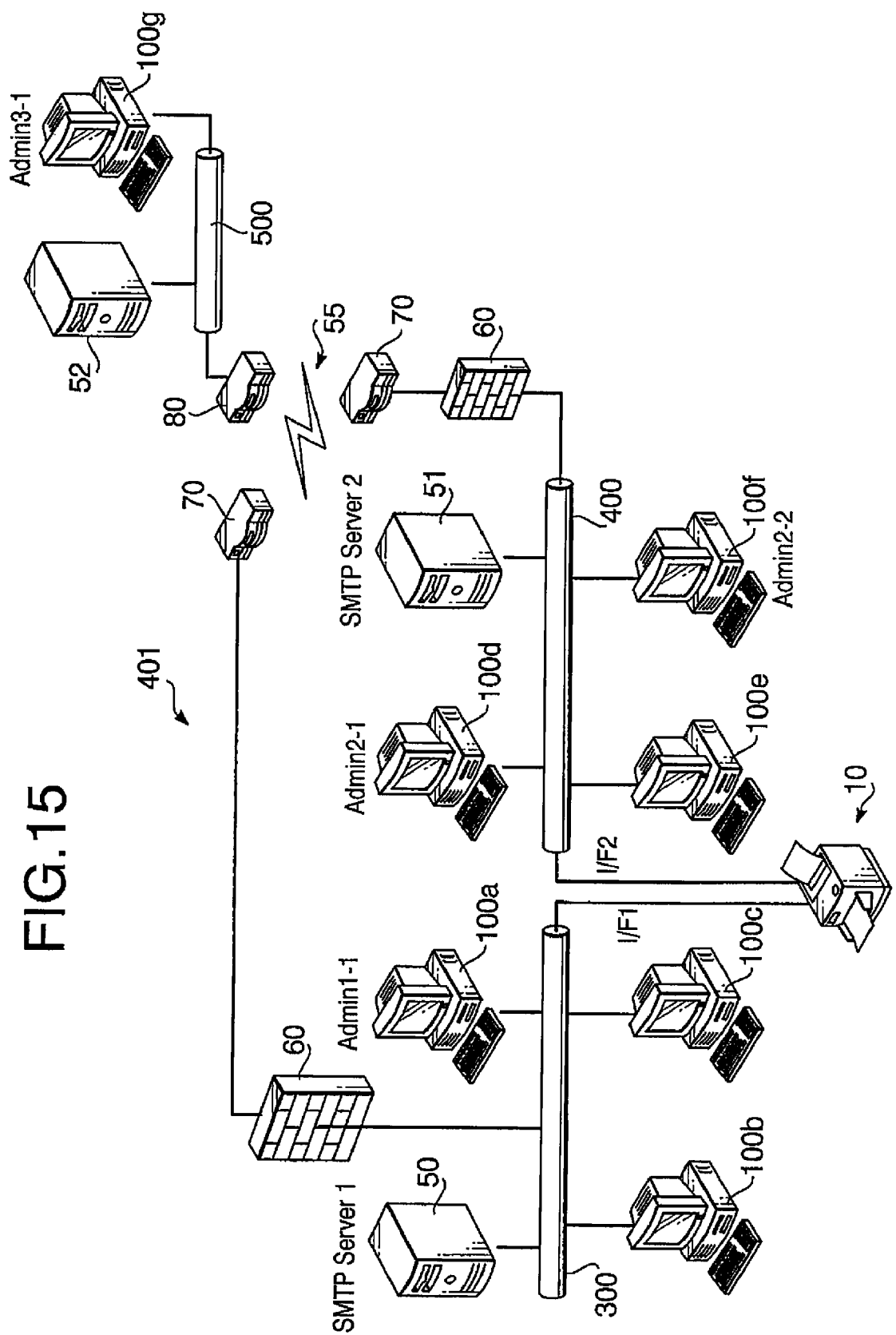
FIG. 15 is a schematic configuration of a network system in accordance with a fourth aspect of the present invention.

FIG. 15 shows an example of a system configured such that the internal network 300 is connected as well to the internet communication network 55 via a firewall 60 in the system shown in FIG. 12. By adding a mail communication server 50 to the network 300, the trouble notification can be given to the management device 100a with the e-mail (or the HTTP) as well. As shown in trouble notification management information of FIG. 16, in contrast to the trouble notification management information shown in FIG. 13, the e-mail is employed as the method of delivering the trouble notifying information to the management device 100a (admin1-1) in the case of "No Paper" (the other settings are the same as those in FIG. 13). Thus, in the management device 100a to which a plurality of methods of delivering the trouble notifying information can be applied, a method of delivering the trouble notifying information can be selected depending on the kind of the trouble caused.

For example, each of the management devices can selectively be used as follows. The management device 100a (admin1-1) is for an administrator in charge of management of the printing papers. The management device 100a is configured to receive the trouble notification by two means of the e-mail and SNMP. In addition, the e-mail can be forwarded to a mobile terminal, so that the administrator can promptly take the trouble notification even when the administrator is away from the management device 100a (admin1-1). The management device 100d (admin2-1) is for an administrator in charge of refill of the toner. The management device 100f (admin2-2) is a terminal device for holding a log in a section of a company where the network 400 is installed. The management device 100f holds the log of the printing device 10 by monitoring the SNMP packet. The management device 100g (admin3-1) is a server for holding a log in a company that manages the printing device 10. The management device 100g can hold the log of the printing device 10 with the e-mail and SNMP to manage the printing device 10.

Further, effects to be accomplished by the fourth aspect are summarized as follows. (a) The trouble notification settings are possible in conformity to an environment. When notifying the management device 100g (server for holding the log in the company that manages the printing device 10) of the trouble, the trouble notification is given with the e-mail in accordance with the settings for the management device 100g (admin3-1) shown in FIG. 16. Although the management device 100g is configured to meet the trouble notification with the SNMP, the management device 100g cannot actually receive the SNMP packet from the printing device 10 due to the firewall 60 blocking the SNMP packet between the printing device 10 and the management device 100g. Even when the trouble notifying method is limited by the environment in this manner, the trouble notification can certainly be given by specifying a trouble notifying method. In addition, the interface for the notified device is set as well in the trouble notification management information of FIG. 16. For example, when the trouble notification is given via the interface I/F1 with the e-mail without any regard for the notified device interface, the trouble notification cannot be given to the management device 100g (admin3-1) in the case where the network 300 is not connected with the internet communication network 55 as shown in FIG. 12. In order to avoid such a problem, it is effective to give the trouble notification by specifying the interface for the notified device in a multi-interface environment.

(b) The fourth aspect according to the present invention can be applied to a terminal device with a limited method of receiving the trouble notification. The management device 100f (admin2-2) is a terminal device, configured to receive the trouble notification only with the SNMP packet, for holding the log. When the method of receiving the trouble notification is limited at a terminal device side, certain trouble notification is possible by specifying the trouble notifying method.

(c) The trouble notification can appropriately be sorted for each of the administrators in charge of the respective kinds of the troubles. In the fourth aspect, the management device 100a (admin1-1) is for the administrator in charge of the refill of the printing papers, and the management device 100d (admin2-1) is for the administrator in charge of the refill of the toner. An actual case where each of maintenances of different kinds of troubles is assigned to a corresponding one of administrators is possible. In such a case, the trouble notification settings (trouble notification management information) can be configured such that the notification of a trouble is given not to an administrator who does not have a capability to handle the trouble, but only to specified administrators. Thereby, since each of the administrators receives only notifications of troubles of which the administrator is in charge, the printing device 10 can more easily be maintained.

(d) The trouble notification setting can be configured such that the method of notifying the administrator of a trouble is changed depending on the importance level of the trouble. In the fourth aspect, when the trouble "No Paper" occurs, it is the management device 100a (admin1-1) that is notified of the trouble. The management device 100a (admin1-1) is notified of other troubles. However, other administrators can handle the aforementioned other troubles ("Cover Open" and "Paper Jam"), while only the specified administrator can handle the trouble "No Paper". Quick detection of the trouble by the management device 100a (admin1-1) is desired. In such a case, the printing device 10 can efficiently be maintained by setting a trouble notifying method in which the administrator can promptly recognize the trouble occurrence.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A network system, comprising:
    a printing device; and
    a plurality of management devices configured to manage the printing device, the plurality of management devices connected with the printing device via a network,
    wherein the printing device comprises:
    a plurality of communication interfaces that are individually connected to the network;
    a trouble detecting system configured to detect one or more of a plurality of potential troubles in the printing device;
    a trouble notification management information storing system configured to store trouble notification management information comprising a dataset storing at least one association between at least one of the plurality of potential troubles, at least one of the plurality of management devices, at least one of the plurality of communication interfaces, and a delivery method; and
    a trouble notifying system configured to deliver trouble notifying information about each of the plurality of potential troubles to each management device associated with the potential trouble, via the communication interface and the delivery method associated with the potential trouble and the management device
    wherein the plurality of management devices comprises a first management device and a second management device,
    wherein the dataset of the trouble notification information storing system is configured to store an association between a detected trouble, the first management device, a first communication interface, and a first delivery method and the dataset of the trouble notification information storing system is configured to store an association between the detected trouble, the second management device, a second communication interface, and a second delivery method, such that when the trouble detecting system detects the detected trouble, the trouble notifying system is configured to deliver trouble notifying information to the first management device using the first delivery method via the first communication interface, and to deliver trouble notifying information to the second management device using the second delivery method via the second communication interface, and
    wherein each of the plurality of the management devices comprises a receiving system configured to receive the trouble notifying information from the printing device.

2. The network system according to claim 1,
    wherein the network connected with the printing device includes a plurality of sub networks, each of which is connected with at least one of the plurality of management devices, and
    wherein the delivery method of delivering the trouble notifying information is specified depending on each of the plurality of sub networks.

3. The network system according to claim 2,
    wherein the plurality of sub networks includes a first network, which is a local area network directly connected with the printing device and the first management device, and a second network including an internet communication network through which the second management device is connected with the printing device,
    wherein the first delivery method is not configured to send information to the internet communication network, and
    wherein the second delivery method is configured to send information to the internet communication network.

4. The network system according to claim 3, wherein the first delivery method is via SNMP.

5. The network system according to claim 3, wherein the second delivery method is via an internet e-mail protocol.

6. The network system according to claim 3, wherein the second delivery method is via an HTTP.

7. The network system according to claim 3, wherein the first and second networks are connected with different ones of the plurality of communication interfaces, respectively.

8. The network system according to claim 3,
    wherein the second network is connected with the first network via a firewall, and
    wherein the trouble notifying information is delivered from the printing device to the second management device via the first network, the firewall, and the second network in this order.

9. A printing device that is managed by a plurality of management devices via a network, comprising:
    a plurality of communication interfaces that are individually connected to the network;
    a trouble detecting system configured to detect one or more of a plurality of potential troubles in the printing device;
    a trouble notification management information storing system configured to store trouble notification management information comprising a dataset storing at least one association between at least one of the plurality of potential troubles, at least one of the plurality of management devices, at least one of the plurality of communication interfaces, and a delivery method; and
    a trouble notifying system configured to deliver trouble notifying information about each of the plurality of potential troubles to each management device associated with the potential trouble, via the communication interface and the delivery method associated with the potential trouble and the management device
    wherein the plurality of management devices comprises a first management device and a second management device,
    wherein the dataset of the trouble notification information storing system is configured to store an association between a detected trouble, the first management device, a first communication interface, and a first delivery method and the dataset of the trouble notification information storing system is configured to store an association between the detected trouble, the second management device, a second communication interface, and a second delivery method, such that when the trouble detecting system detects the detected trouble, the trouble notifying system is configured to deliver trouble notifying information to the first management device using the first delivery method via the first communication interface, and to deliver trouble notifying information to the second management device using the second delivery method via the second communication interface.

10. A computer program product comprising a computer usable medium having computer readable instructions that causes a computer to control a printing device, which is managed by a plurality of management devices via a network, having a plurality of communication interfaces individually connected to the network, wherein execution of the computer-readable instructions cause the computer to execute the steps of:

detect one or more of a plurality of potential troubles in the printing device;

store trouble notification management information comprising a dataset storing at least one association between at least one of the plurality of potential troubles, at least one of the plurality of management devices, at least one of the plurality of communication interfaces, and a delivery method; and deliver trouble notifying information about each of the plurality of potential troubles to each management device associated with the potential trouble, via the communication interface and the delivery method associated with the potential trouble and the management device wherein the plurality of management devices comprises a first management device and a second management device, wherein the dataset is configured to store an association between a detected trouble, the first management device, a first communication interface, and a first delivery method and the dataset is configured to store an association between the detected trouble, the second management device, a second communication interface, and a second delivery method, such that when the detected trouble is detected, to deliver trouble notifying information to the first management device using the first delivery method via the first communication interface, and to deliver trouble notifying information to the second management device using the second delivery method via the second communication interface.

11. A network system, comprising:

a printing device; and a plurality of management devices configured to manage the printing device via a network configured with a plurality of sub networks, each of the plurality of sub networks including at least one of the plurality of management devices connected thereto, wherein the printing device comprises:

a plurality of communication interfaces configured connected to different sub networks, respectively;

a trouble detecting system configured to detect one or more of a plurality of potential troubles in the printing device;

a trouble notification management information storing system configured to store trouble notification management information comprising a dataset storing at least one association between at least one of the plurality of potential troubles, at least one of the plurality of management devices, at least one of the plurality of communication interfaces, and a delivery method; and a trouble notifying system configured to deliver trouble notifying information to each management device about each of the plurality of potential troubles that the management device is associated with, via the communication interface and the delivery method associated with the management device and the potential trouble wherein the plurality of management devices comprises a first management device and a second management device, wherein the dataset of the trouble notification information storing system is configured to store an association between a detected trouble, the first management device, a first communication interface, and a first delivery method and the dataset of the trouble notification information storing system is configured to store an association between the detected trouble, the second management device, a second communication interface, and a second delivery method, such that when the trouble detecting system detects the detected trouble, the trouble notifying system is configured to deliver trouble notifying information to the first management device using the first delivery method via the first communication interface, and to deliver trouble notifying information to the second management device using the second delivery method via the second communication interface, and wherein each of the plurality of the management devices comprises a receiving system configured to receive the trouble notifying information from the printing device.

\* \* \* \* \*